United States Patent
Clapper

(10) Patent No.: US 7,434,171 B2
(45) Date of Patent: Oct. 7, 2008

(54) PERFORMANCE CONTROL APPARATUS

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 10/808,950

(22) Filed: Mar. 25, 2004

(65) Prior Publication Data
US 2005/0212781 A1 Sep. 29, 2005

(51) Int. Cl.
G06F 3/048 (2006.01)
G06F 1/00 (2006.01)
G06F 1/24 (2006.01)
G06F 1/04 (2006.01)
G06F 3/033 (2006.01)

(52) U.S. Cl. ............... 715/771; 715/966; 715/965; 713/322; 713/100; 713/600; 345/184

(58) Field of Classification Search ............ 715/966, 715/965, 771, 968; 713/322, 100, 600; 345/184
See application file for complete search history.

(56) References Cited

U.S. PATENT DOCUMENTS

| | | | | |
|---|---|---|---|---|
| 3,654,710 A | * | 4/1972 | Barnard | 434/258 |
| 5,134,703 A | * | 7/1992 | Bumbarger | 713/501 |
| 5,550,970 A | * | 8/1996 | Cline et al. | 715/772 |
| 5,561,792 A | * | 10/1996 | Ganapathy | 713/501 |
| 5,630,148 A | * | 5/1997 | Norris | 713/322 |
| 5,784,598 A | * | 7/1998 | Griffith | 713/501 |
| 5,958,058 A | * | 9/1999 | Barrus | 713/320 |
| 5,959,610 A | * | 9/1999 | Silfvast | 345/156 |
| 6,014,611 A | * | 1/2000 | Arai et al. | 702/132 |
| 6,289,399 B1 | * | 9/2001 | Furuichi et al. | 710/6 |
| 6,311,287 B1 | * | 10/2001 | Dischler et al. | 713/601 |
| 6,411,234 B1 | * | 6/2002 | Sunstein | 341/126 |
| 6,513,124 B1 | * | 1/2003 | Furuichi et al. | 713/322 |
| 6,627,829 B2 | * | 9/2003 | Sato | 200/310 |
| 6,704,879 B1 | * | 3/2004 | Parrish | 713/322 |
| 6,751,739 B1 | * | 6/2004 | Verdun | 713/300 |
| 6,862,482 B2 | * | 3/2005 | Peterson et al. | 700/19 |

(Continued)

OTHER PUBLICATIONS

Phoenix Technologies Ltd., Phoenix PowerPanel 3.0, Mar. 5, 2000, Internet Archive Wayback Machine(www.waybackmachine.org).*

(Continued)

*Primary Examiner*—Tadesse Hailu
*Assistant Examiner*—Nicholas S Ulrich
(74) *Attorney, Agent, or Firm*—Carrie Boone; Carrie A. Boone, P.C.

(57) ABSTRACT

A variety of performance control mechanisms are disclosed, allowing a user of a processor-based system to adjust performance criteria such as processing speed and fan speed. A performance control apparatus includes one or more user-accessible knobs and a display. The knob(s) enable the user to select from a variety of processor and fan speed settings. Other performance-related criteria may also be controlled using the knobs. The display communicates the effect of a change in performance criteria in a manner useful to the user. A performance control application program enables the user to independently pre-select performance criteria for each application program or group of application programs. A performance control icon provides the ability to select performance criteria from within an application program.

20 Claims, 5 Drawing Sheets

U.S. PATENT DOCUMENTS

| | | | | |
|---|---|---|---|---|
| 6,901,557 | B1* | 5/2005 | Martinez et al. | 715/772 |
| 6,952,782 | B2* | 10/2005 | Staiger | 713/300 |
| 6,996,333 | B1* | 2/2006 | Lin | 388/800 |
| 7,089,430 | B2* | 8/2006 | Cooper | 713/300 |
| 7,100,068 | B2* | 8/2006 | Shyu | 713/600 |
| 7,146,511 | B2* | 12/2006 | Barr et al. | 713/300 |
| 2005/0030171 | A1* | 2/2005 | Liu et al. | 340/500 |
| 2005/0053492 | A1* | 3/2005 | Su | 417/423.3 |

OTHER PUBLICATIONS

DE 20315282, Cooling fan for computer, Feb. 5, 2004, Derwent Information LTD.*

* cited by examiner

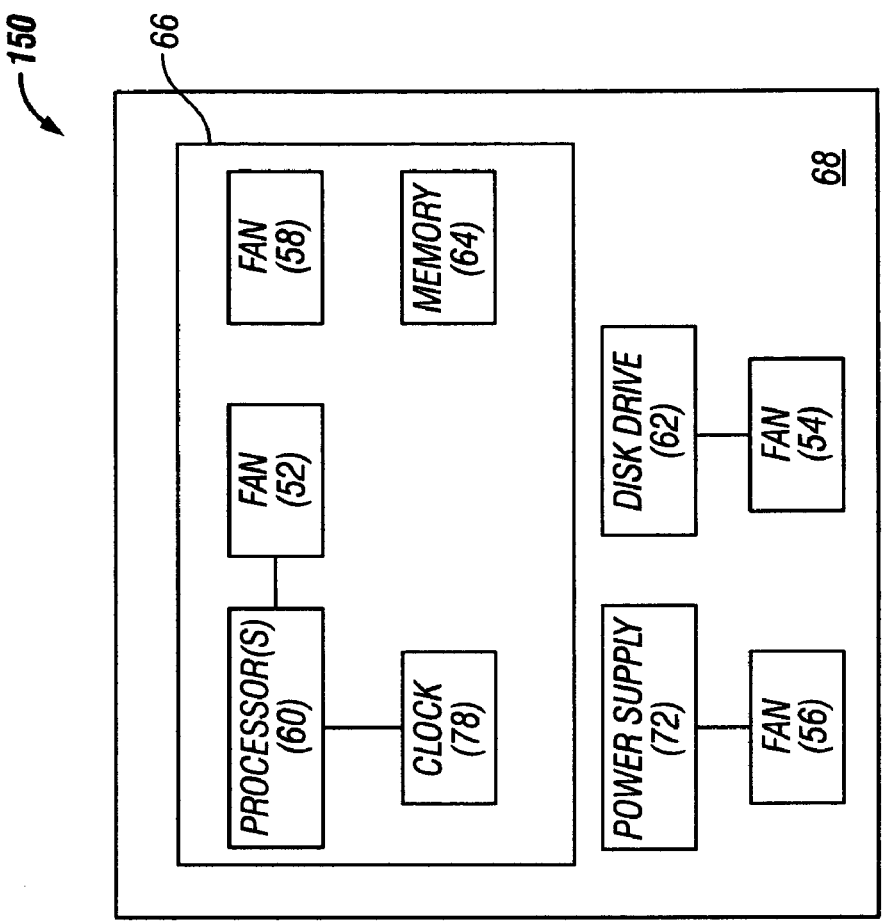
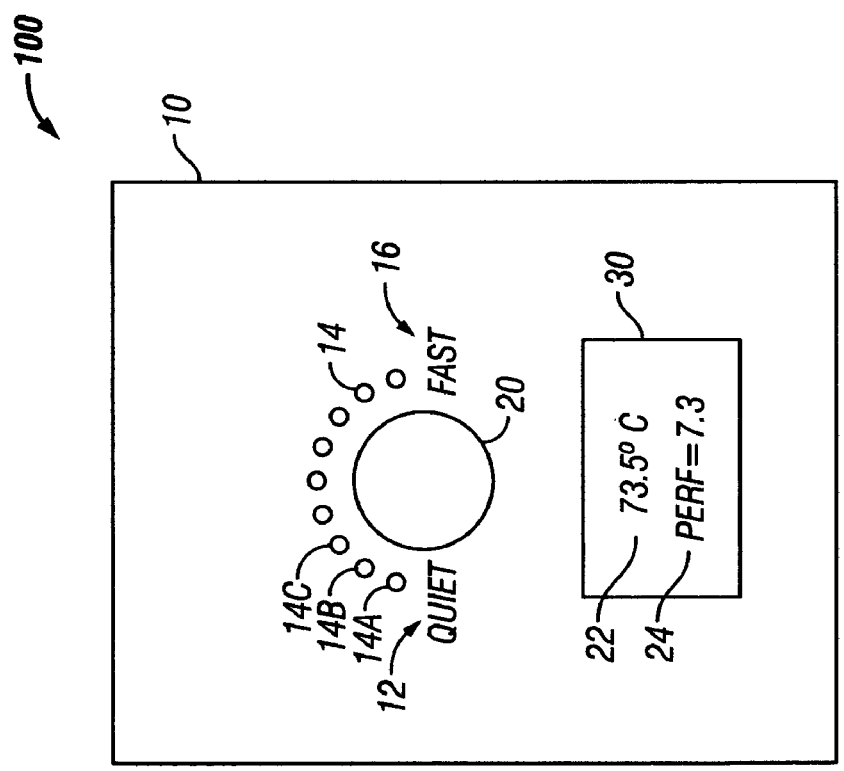
*FIGURE 2 (PRIOR ART)*
*FIGURE 1*

| Application | App Group | Clock Rate | System Noise |
|---|---|---|---|
| ProEngineer / Solidworks / Rhinoceros / Alias / Add... | MCAD | [slider] | [slider] |
| Doom / Duke Nukem / Add... | GAMES | [slider] | [slider] |
| MP3 Jukebox / Windows Media Player / Real Audio / Add... | MUSIC | [slider] | [slider] |
| Windows Media Player / Real Player / Add... | VIDEO | [slider] | [slider] |
| Picture Slideshow | CUSTOM | [slider] | [slider] |

*FIGURE 5*

| File Type AUDIO | File Type VIDEO | File Type CAD |
|---|---|---|
| .wav<br>.mp3<br>.mid<br>.ra<br>.snd | .mov<br>.rm<br>.avi<br>.mpeg<br>.mpg | .dxf<br>.ai<br>.nc<br>.dwg<br>.cdr<br>.cdl |
| Low Noise | Medium Clock Rate | High Clock Rate |

FIGURE 6

PERFORMANCE CONTROL APPARATUS

FIELD OF THE INVENTION

This invention relates to processor-based system performance, and, more particularly, to a performance control mechanism.

BACKGROUND OF THE INVENTION

Processor-based systems, including personal computers, servers, and mainframes, may include a number of features that impact the overall performance of the system. As described herein, performance includes characteristics such as the processing speed and the noise generated by the system (system noise).

The processing speed determines how quickly software running on the processor-based system is executed. The speed of the processor clock, the number and type of processors in the system, as well as the implementation of particular processing features, such as pipelining and caching operations, influence the processing speed.

The noise generated by the processor-based system, may result from the operation of drive media, such as fixed disk drives, floppy drives, compact disk read-only memory (CDROM) drives, and other non-volatile media, as well as by the operation of one or more fans contained within the system chassis. The fans, of which there may be several, may be used to cool the drive media, the processor, one or more power supplies, and/or the system board generally.

Sometimes, there exists an inverse correlation between processing speed and system noise within the processor-based system. This is because when the processor executes instructions at a higher clock rate, it tends to get hotter. Accordingly, a fan designated to keep the processor cool may operate at a faster speed (typically given in cubic feet per minute, or CFM) to maintain the processor at a safe operating temperature. The higher fan speed typically generates more noise. A higher performing processor may also draw more power, causing a power supply fan to deliver higher power and at a higher temperature, which may cause the power supply fan to run at a higher speed, thus increasing the noise level of the system. A program that requires frequent disk drive access may cause the drive to run at a higher average speed, which produces mechanical noise due to the spin of the drive. Thus, a system with a high-performing processor tends to be noisier than one with a low-performing processor, although this is not always the case.

Traditionally, users of processor-based systems have had little control over these performance characteristics. While some processor-based systems include a mechanism for changing the clock rate of the processor, these systems typically prevent the user from setting a clock rate that is faster than a manufacturer-recommended maximum clock rate. Industrious users have access to mechanisms to "over-clock" the processor, sometimes with a limited understanding about the effect such change may have on the life of the processor. Further, processor-based systems do not give the user the ability to control other performance-related characteristics, such as fan speed and disk media usage.

Thus, there is a continuing need for an apparatus that gives a user of a processor-based system some control over performance features.

BRIEF DESCRIPTION OF THE DRAWINGS

FIG. 1 is a diagram of a performance control apparatus of a processor-based system, according to some embodiments of the invention;

FIG. 2 is a schematic block diagram of some performance-related features of a processor-based system, according to the prior art;

FIG. 5 is a screen shot of a performance control application program, according to some embodiments of the invention;

FIG. 6 is a screen shot of a third performance control apparatus of a processor-based system, according to some embodiments of the invention.

DETAILED DESCRIPTION

Figure 3:
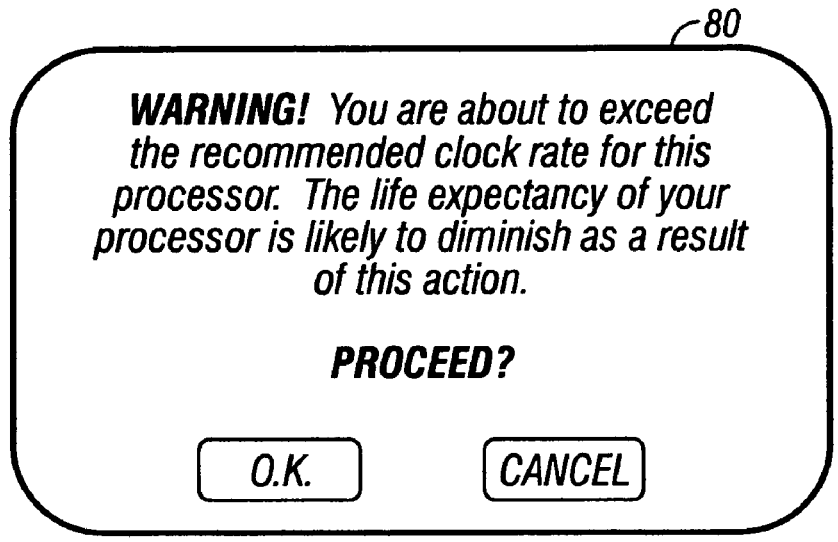
FIG. 3 is a screen shot of a warning screen that may be displayed while using the performance control apparatus of FIG. 1, according to some embodiments of the invention.

In accordance with the embodiments described herein, performance control mechanisms are disclosed, allowing a user of a processor-based system to adjust performance criteria such as processing speed and fan speed. Performance control mechanisms include a performance control apparatus, a performance control application program, and a performance control icon.

The performance control apparatus includes a user-accessible knob and a display. The knob enables the user to select from a variety of processor and fan speed settings. The display communicates the effect of the knob selection to the user. A second performance control apparatus includes multiple knobs, for independently controlling multiple performance criteria.

The performance control application program enables the user to independently pre-select performance criteria for each application program or group of application programs. The performance control icon provides the ability to select performance criteria from within an application program.

In FIG. 1, a performance control apparatus 10 of a processor-based system 100, such as a personal computer, is depicted, according to some embodiments. The performance control apparatus 10 may be disposed on the front, side, or back panel of a chassis of the processor-based system 100. Or, the performance control apparatus 10 may be part of a video enclosure, such as a cathode ray tube (CRT) monitor or other encasing that is visible or readily accessible to a user. The processor-based system 100 includes at least one processor and one or more fans (not shown).

The performance control apparatus 10 features a knob 20 and a display 30. The knob 20 is user-adjustable, for controlling one or more performance-related components of the processor-based system. The display 30 communicates information relevant to the performance of the processor-based system.

In some embodiments, the performance control apparatus 10 allows the user of the processor-based system 100 to change the processing speed and fan speed simultaneously. The knob 20 is a selector, allowing the user to decide what level of fan noise is acceptable based on a desired processor speed setting. Upon rotating the knob 20, the user may audibly notice the effect on the fan speed within the system 100. Additionally, the display 30 includes indicators 20, 22, for communicating to the user how a change in the knob position affects the performance criteria of the processor-based system 100.

Generally, a processor-based system may include a number of features that affect either the system noise or the processing speed of the system, known herein as the performance criteria of the system. Some features are indicated schematically in the block diagram of FIG. 2, according to the prior art, which depicts a chassis 68 of a typical processor-based system 150. The processor-based system 150 may, for example, include one or more fans 52, 54, 56, 58 on or near a system board 66. The fans provide cooling, either to the entire system board 66, or to one or more components on or connected to the system board.

For example, the fan 52 may be dedicated to cooling one or more processors 60 on the system board 66. The fan 52 may work in conjunction with a heatsink (not shown) disposed atop the processor(s). Fans may also be used for other heat-producing semiconductor devices, such as digital signal processors (DSPs), coprocessors, and gate arrays. The fan 54 cools a disk drive 62. Other drive media, such as CDROM drives, floppy drives, and tape drives, may each operate with a dedicated fan. The fan 56 cools the power supply 72 while the fan 58 is employed to cool the entire chassis 68 of the processor-based system.

The fans may run at a single speed, may be hardware-switchable to multiple speed settings, or may be controllable via software. While the fans are present in the processor-based system 150 for the purpose of cooling the circuitry, the fans additionally generate noise. In some circumstances, the additional noise caused by fans may be undesirable.

In addition to producing heat, the disk drive 62 (or other non-volatile memory) may also generate noise during use. This may be noticeable for software programs running from the disk drive 62 or from a volatile memory 64. A software program loaded into the volatile memory 64 may access data, such as tables, stored on the disk drive, temporarily increasing the noise level of the processor-based system 150. It is possible to eliminate the noise generated by the disk drive 62 by loading the software program and any additional data used by the software program into the volatile memory 64, as long as the memory size is sufficient. Since the disk drive 62 is no longer accessed, this will lower the noise level of the processor-based system 150. Further, by running the software program and associated data strictly in volatile memory, the performance of the program is generally higher, as memory accesses are typically much faster than disk drive accesses. However, the increased memory use may adversely impact the speed at which other software programs loaded in the processor-based system 150 are executed. Thus, the use of volatile memory or non-volatile memory may affect the noise generated by the processor-based system.

The processor(s) 60 are typically operable at different speeds, by setting a clock 78 connected to the processor. The fan 52, which thermally manages the processor, may also run at different speeds. (Thermal management of the processor, if done properly, is known to extend its operating life.) Again, the processing speed indirectly affects the noise of the system.

The speed of the clock 78 is typically measured in megahertz, or MHz. When the processor 60 operates at an increased clock rate (e.g., higher MHz operation), the processor 60 is able to process more instructions in a given time period (typically given as millions of instructions per second, or MIPS). The higher clock rate causes the processor 60 to generate more heat, possibly causing the fan 52 to operate at a higher speed (in which the flow rate of the fan may be specified in cubic feet per minute, or CFM), resulting in more system noise.

The processor-based system 100 of FIG. 1 includes some or all of the features of the prior art processor-based system 150. These features affect the noise level, the processor speed, or both performance characteristics of the processor-based system 100. In some embodiments, the performance control apparatus 10 enables the user to control the processing speed and the fan speed, but not the drive media usage. In other embodiments, the user may control additional performance-related characteristics of the system (see FIG. 4, below).

The knob 20 of the performance control apparatus 10 enables the user of the processor-based system 100 to interactively modify the fan and processor speeds. An increase or decrease in fan noise instantly communicates the effects of the knob change to the user. The display 30 offers additional performance-related information. Together, the acoustics of the fan and the information on the display 30 relate the tradeoffs between noise and processing speed to the user in a natural way.

In some embodiments, the knob 20 is digital, having discrete settings for each of the possible speeds of the one or more fans. The settings can be conveyed to the user in a variety of ways. For example, in FIG. 1, the knob 20 includes a pair of labels, "quiet" 12 and "fast" 16, positioned adjacent to the knob, and at opposing ends of the knob spectrum. The knob 20 also features a number of light-emitting diodes (LEDs) 14A, 14B, 14C, . . . (collectively, LEDs 14).

When the knob is rotated clockwise, the one or more fans are driven to a higher speed. This increases the noise level (typically measured in decibels, or dB) of the processor-based system 100. The clock rate of the processor 60 may likewise be increased. The clockwise rotation of the knob 20 may be preferred when performance is more important than noise level to the user. High-performing software programs, such as 3D graphics and gaming software, may be among the types of programs in which a higher processing speed is desired.

As the knob 20 is rotated clockwise, the display 30 changes, in some embodiments. In FIG. 1, the display 30 includes two indicators 22, 24, for communicating the performance characteristics of the processor-based system 100. The indicator 22, or temperature indicator, shows the temperature of the processor 60. When the knob 20 is rotated clockwise, the indicator 22 shows an increase in the temperature of the processor 60. As other possibilities, the indicator may be a clock rate indicator, specifying the speed of the processor clock (in MHz), or a MIPS indicator, specifying the instruction rate of the processor.

The display 30 also provides a performance indicator 24 that depicts a relative performance level, rated from one to ten, of the processor-based system 100. The performance indicator 24 ties the two performance-related criteria, processing speed and clock rate, together, and represents this information numerically. For example, the performance indicator 24 may specify a performance level of one when the clock 78 is running at its lowest possible speed and the fan(s) are running at their quietest. The performance indicator 24 may specify a performance level of ten when the clock 78 is running at its highest possible safe speed and the fans are running at their highest CFM rate. (As another possibility, a performance level of zero may be displayed when the system is first powered on, or when the system resources are so depleted that a lockup of the system is imminent.) A performance level of 7.3 is shown in FIG. 1, indicating that the processor is running at a relatively high clock speed and fan rate.

The LEDs 14, which are disposed adjacent to and partially surrounding the knob 20, provide another visual indication of the tradeoff between performance criteria of the processor-based system 100. In some embodiments, the LEDs 14 are tri-stated, so that the LED color may change. For example, the LEDs 14 may turn green, then red, in response to a particular performance condition of the processor-based system 100.

Some computer users modify their system so that the processor runs at a speed that is outside the manufacturer-suggested operating range. Savvy users may recognize that the operating life of the processor is sacrificed as a result of this deliberate over-clocking, but are willing to make the tradeoff in order to obtain very high processor performance.

In some embodiments, the system 100 may be over-clocked by turning the knob 20 beyond a predetermined optimum setting. For example, where the knob 20 starts at the "quiet" label 12, once the knob 20 is rotated in a clockwise direction, the first LED 14A turns green, then the second LED 14B turns green, then the third LED 14C turns green, and so on, until all the LEDs 14 are green. When all the LEDs 14 are green, the clock 78 is operating at the highest manufacturer-suggested speed, known herein as the optimum clock rate.

However, the knob 20 may not be positioned at the "fast" setting, but still be capable of clockwise rotation. At this point, once further clockwise rotation occurs, the first LED 14A changes from green to red. This visually communicates to the user that the processor is now operating at a speed that is beyond the optimum clock rate. A further clockwise turn of the knob 20 causes the second LED 14B to change from green to red. This process will continue until all the LEDs 14 have changed from green to red.

In some embodiments, the knob 20 may be fully rotated multiple times. In such a configuration, the LEDS 14 can illuminate in a distinct color for each revolution of the knob 20. Accordingly, the labels 12, 16 may be enhanced to specify a distinct knob state at each revolution. A myriad of other possibilities exist for communicating the effect of changing the knob state to the user.

By running the processor 60 at a speed beyond the optimum clock rate, the processor life may be sacrificed. When and why a processor stops working is difficult to precisely ascertain, although graphs charting the processor life at a given operating temperature may allow the operating life of the processor running at a different temperature to generally be inferred. Absent such investigation, the user of the processor-based system 100 is likely to understand that running the system with all the LEDs 14 in their red state is more detrimental to the processor life than running the system with just one or two LEDs in their red state, during the same time period.

The system 100 may include an additional feature, such as a warning screen appearing on a video display, which communicates to the user the consequences of over-clocking the processor. For example, in FIG. 3, the user is presented with a warning screen 80, which presents the option to cancel the over-clocking feature. Optionally, with each increment of the knob 20 past the predetermined optimum setting, multiple warning screens may be used, with increasingly dire statements about the consequences of over-clocking.

When the knob 20 is rotated counter-clockwise, the speed of the one or more fans is slowed down (lower CFM). Likewise, the clock rate is lowered, reducing the processor instruction rate. The fans 52, 54, 56, 58 tend to be quieter when they operate at a lower speed and the processor 60 generally is less hot. A corresponding change in the display 30 is also visible. When the knob 20 is rotated counter-clockwise, the temperature indicator 22 shows a lowered processor temperature while the performance indicator 24 shows a lowered performance value.

Since a single knob 20 is available to the user to control both the fan speed and the clock rate, a profile relating the two system characteristics may be developed. For example, an empirical evaluation of fan speed/processor clock rate could be developed so as to make a number of setting combinations available to the user. For every turn of the knob 20, a distinct fan speed and a distinct processor clock rate may be obtained, as one example. Because the knob 20 relates the two distinct system characteristics to one another, the user is unable to control the processor clock rate in a manner that is entirely independent of the fan speed.

The knob 20 may be persistent; that is, the setting of the knob is maintained following a reset of the processor-based system 100. Or, the knob may be reset to a default state at every power-on. In some embodiments, the knob 20 includes a "push preset" feature similar to that found in car stereo systems for presetting a radio station. The user turns the knob until a desired position is reached, then pushes in the knob (there may be an audible "click"). In this manner, the setting of the knob 20 is maintained, even across reboots of the processor-based system 100, until such time as the user again adjusts the knob.

There may exist other operations for which a specific correlation to the processor temperature, clock rate, or fan speed is identified, such as in future processor-based systems. These operations may be suitable for user control as well. Such operations may also be referenced in the display 30, either as part of the performance indicator 24, along with fan speed and processor temperature, or as a distinct indicator.

Figure 4:
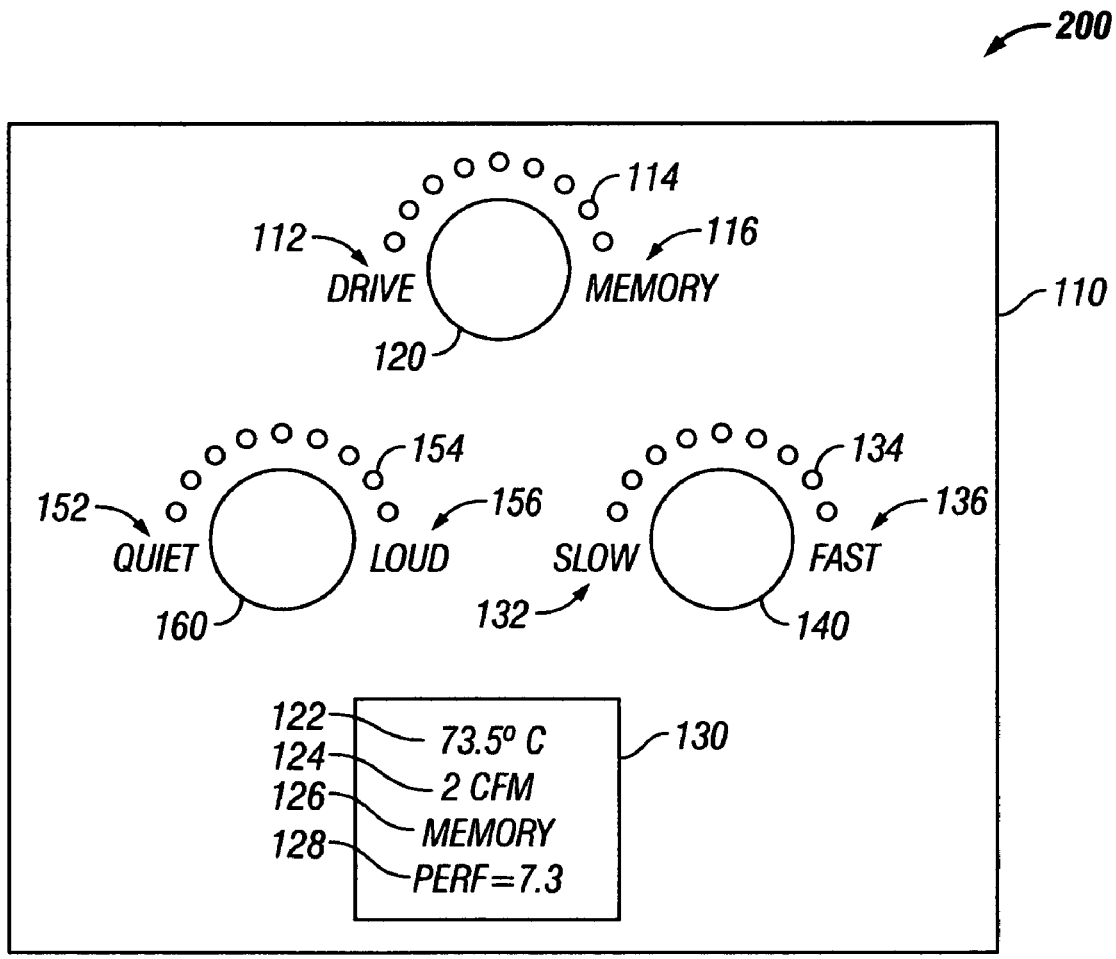
FIG. 4 is a diagram of a second performance control apparatus of a processor-based system, according to some embodiments of the invention.

In contrast, the processor-based system 200 of FIG. 4, in which a performance control apparatus 110, featuring three knobs 120, 140, 160 and a display 130, provides the user with independent control of multiple performance-based characteristics of the system, according to some embodiments. The processor-based system 200 includes some or all of the performance-related features schematically described in FIG. 2.

The knob 120 provides a mechanism by which the user of the processor-based system 200 can control whether the currently running software is operating strictly from the disk drive 62 (as indicated by the "disk drive" label 112), strictly from the memory 64 (as indicated by the "memory" label 116), or from a combination of the disk drive and the memory. The knob 120 includes LEDs 114 that may turn on as the knob 120 is rotated clockwise, and turn off when the knob 120 is rotated counter-clockwise. Or, the LEDs may change color to indicate a critical condition, such as when the amount of memory 64 in the processor-based system 200 is insufficient to support executing the software program entirely in the memory.

The knob 140 provides a mechanism by which the user of the processor-based system 200 can control the speed of the clock 78 connected to the processor 60. The knob 140 includes a "slow" label 132 and a "fast" label 136, positioned at opposing ends of the knob spectrum. (As another option, the labels could include minimum and maximum clock rates, in MHz.) When the knob 140 is positioned at the label 132, the processor is running at its lowest possible clock speed. When the knob 140 is positioned at the label 136, the processor is running at its fastest possible clock speed. In contrast to the knob 20 of FIG. 1, the knob 140 enables the user to change the processor clock rate, without regard to the fan speed.

The knob 140 also includes LEDs 134, which may sequentially turn on as the knob 140 is turned, indicating the current knob position. As with the knob 20 of FIG. 1, the LEDs 134 may change color, such as from green to red, to indicate to the user that the clock speed is beyond an optimum clock rate.

The knob 160 provides a mechanism by which the user of the processor-based system 200 can control the speed of the one or more fans present in the system. Associated with the knob 160 are two labels, a "quiet" label 152 and a "loud" label 156, positioned at opposing ends of the knob spectrum. When the knob 160 is positioned at the label 152, the one or more fans are operating at the lowest possible speed (CFM); when the knob 160 is positioned at the "loud" label 156, the one or more fans are operating at the highest possible speed, with other fan speeds being controllable by the user between these extremes. Where multiple fans are present, a profile of each fan, including the dB level at each fan speed, could be used to determine the fan speeds associated with each position of the knob 160.

A display 130 provides additional performance characteristics that may be beneficial to the user. The processor temperature indicator 122, for example, changes when the knob 140 is turned. This communicates to the user that an increase in processor speed causes an increase in processor temperature. Additionally, the display 130 features a fan speed indicator 124 and a drive/memory indicator 126. The fan speed indicator 124 changes when the position of the knob 160 is changed; likewise, the drive/memory indicator 126 changes when the position of the knob 120 is changed.

The performance indicator 128 changes in response to any of the three knob positions being changed. Thus, the performance indicator represents an amalgam of the various performance characteristics of the processor-based system 200. The display indicators, the LEDs, and the system noise (e.g., fan noise) provide a natural way for the user to understand the relationship between the various performance characteristics of the processor-based system 200.

Another mechanism by which a user of a processor-based system can modify performance-related criteria is illustrated in the screen shot of FIG. 5, according to some embodiments. The screen shot is a graphical user interface (GUI) 302 of a performance control application program (PCAP) 300. The PCAP 300 is run on a processor-based system, such as the previously described processor-based systems 100, 150, 200. The PCAP 300 allows a user of the processor-based system to control performance characteristics differently, depending upon which application program is running in the system.

The GUI 302 of the PCAP 300 includes four columns 310, 312, 314, and 316, according to some embodiments. Column 310, entitled "application," includes a list of application programs 320 that are of concern to the user of the processor-based system. The PCAP 300 allows the user to add to the list of programs, as new programs are loaded onto the processor-based system. The application programs 320 may be loaded automatically into the PCAP 300 or the user may manually enter the application programs into the "application" column 310 of the PCAP 300.

The second column 312, entitled "app group," divides the application programs 320 into various categories 322. In FIG. 5, the categories, "mechanical computer-aided design" ("MCAD"), "games", "music", "video", and "custom", are depicted, as examples. The user can add application programs 320 and categories 322, as programs are added to the processor-based system.

Columns 314 and 316, entitled "clock rate" and "system noise," respectively, include horizontal lines 324 and sliding bars 326, one for each category of applications listed in the GUI 302. Each horizontal line 324/sliding bar 326 is independent of others shown in the GUI 302. The sliding bars 326 may be selected using a pointing device, such as a mouse. By clicking on the sliding bar 326, its horizontal position may be changed along the length of the horizontal line 324. A horizontal line 324/sliding bar 326 is provided for each performance criterion (e.g., clock rate or system noise), as well as for each category 322 of application programs 320.

The sliding bar 326 moves along the horizontal line 324, where a leftmost position (as viewed from FIG. 5) of the sliding bar 326 specifies a minimum value and a rightmost position specifies a maximum value. Moving the sliding bar 326 in the column 314, first row, for example, affects the clock rate for the MCAD applications. Moving the sliding bar 326 in the column 316, third row, affects the system noise for the music applications. A variety of other implementations of the GUI 302 is possible, for giving performance control, on a per application program basis, to the user.

The performance control application program 300 allows the user to optimally preset performance criteria for each application program running on the processor-based system. Application programs, such as MCAD and gaming programs, for example, may optimally operate at the highest available processing speeds. Music programs are optimally enjoyed when the noise of the processor-based system is minimal, e.g., when fan speeds are low. The fine-tuning of the performance criteria empowers the user to obtain an optimum benefit using the processor-based system.

Like the LEDs of the performance control apparatus of FIG. 1, the performance control application program 300 may include warning indicators, such as when the processor is being over-clocked or when the fan speed is insufficient to cool the processor. These indicators may come in the form of additional screen shots (e.g., "warning" screens), audible indicators, and the like. Programmers of ordinary skill in the art recognize a number of ways in which the user may be apprised of these non-optimal operating conditions.

Performance criteria may also be adjusted in other ways. For example, in FIG. 6, a performance control screen 350 specifies performance criteria according to file type. Suitable particularly where standard file types are used, the performance control screen 350 enables the performance criteria to automatically be established for different file types running within the processor-based system 150.

The performance control screen 350 of FIG. 6 includes three groupings of files: audio files 352, video files 354, and computer-aided design (CAD) files 356. A listing of valid file type extensions 370 for each grouping is depicted as well. Optionally, the user may be able to add to the list of valid extensions for each file type grouping. Configuration profiles for each grouping are also identified. The audio files 352 have a "low noise" configuration profile 362. This means that, whenever audio files are played on the processor-based system 150, the performance criteria will be adjusted to lower the noise level of the system. This may include lowering the speed of one or more fans, running the file from volatile memory rather than non-volatile memory, and so on. The video files 354 have a "medium clock rate" configuration profile 364 while the CAD files 356 have a "high clock rate" configuration profile 366. When video or CAD files are run, the processor clock speed will be increased automatically, slightly for the video file and more substantially for the CAD files, as examples. The configuration profiles 362, 364, 366 may be changed, such as by clicking on the profiles with a mouse or other pointing device.

The performance control screen 350 may be an application or an operating system program, or may be accessible by initiating a keystroke sequence, pressing a button on a front panel, or by another mechanism. The performance control screen 350 is useful for those users who prefer not to update performance criteria every time they load a new application program on their system. It is possible that when a user specifies particular performance criteria for a sound file, the user may prefer that same criteria for all other sound files that may be run. The performance control screen 350 thus facilitates adjusting performance criteria according to file types rather than according to application program.

Figure 7:
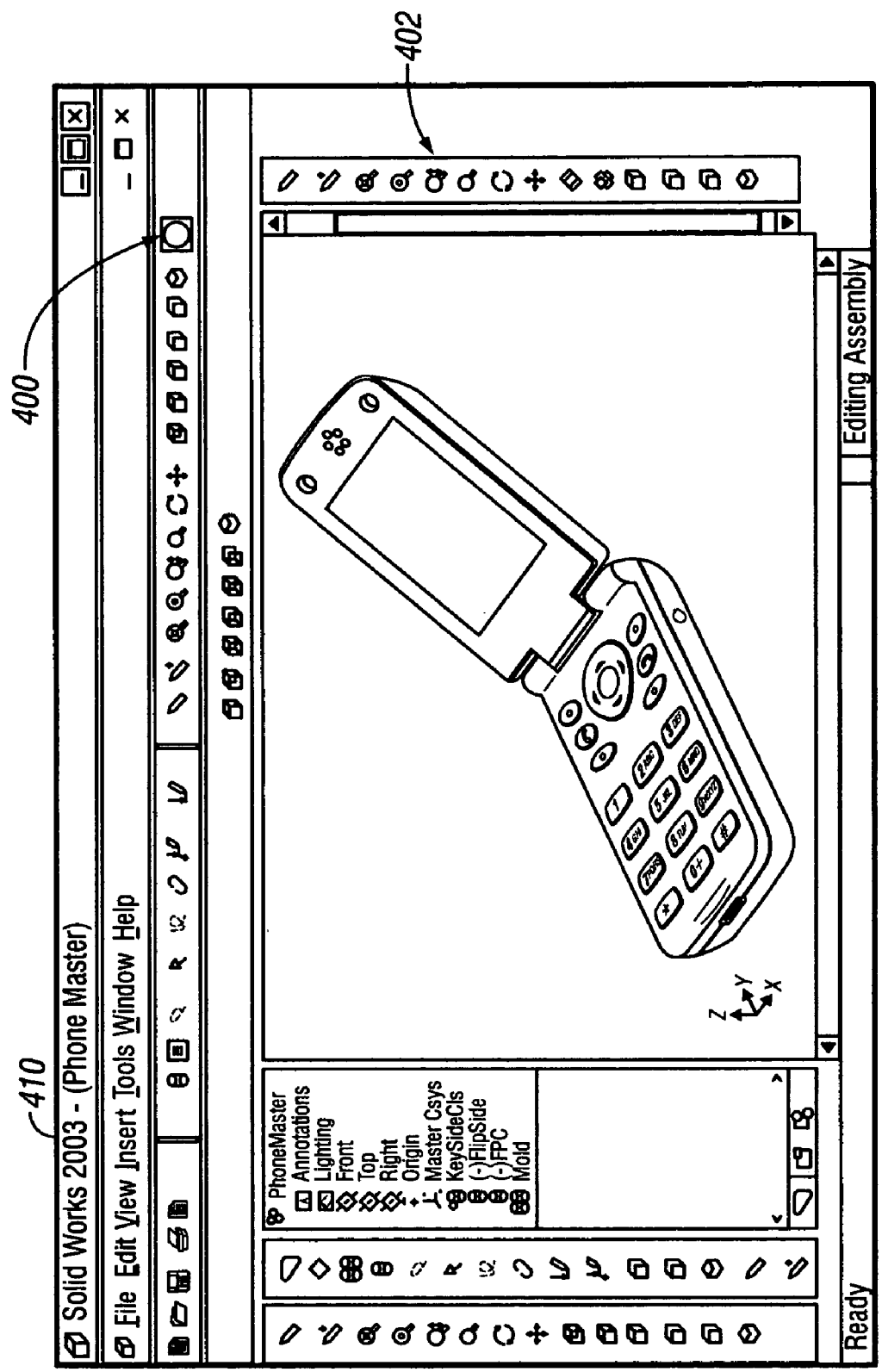
FIG. 7 is a screen shot of an application program including a performance control icon, according to some embodiments of the invention.

As another possibility, the user may modify performance-related criteria within individual application programs. In FIG. 7, according to some embodiments, a GUI 402 for an application program 410 is depicted. The application program is an MCAD program, but the principles described herein may be applied to virtually any application program. The GUI 402 includes a number of features familiar to users of software programs, including pull-down menus, icons, and display windows. Additionally, the GUI 402 features a performance control icon 400.

The performance control icon 400 may generated by code and contained within a dynamic link library (DLL). The DLL file is then available to all application programs that support them. Most application programs running under the Windows operating system, for example, support DLL files. (Windows operating system is a product of Microsoft Corporation, of Redmond, Wash.)

When the user clicks on the performance control icon 400, an additional screen may emerge (not shown). This screen provides the user with the ability to modify one or more performance-related criteria, such as processing speed, fan speed, or drive/media access. The additional screen may present these options in a number of ways, such as by depicting a pointing device-controllable "knob" graphic, a sliding bar graphic (as in FIG. 5), a pull-down menu of the available selections, and so on. Like the performance control application program 400, "warning" screens and audible indicators may be used to get the attention of the user, such as when the user is putting the processor-based system in a non-optimal performance state.

Once the user makes a change the performance criteria of the system are changed specifically for execution of the application program 410. Once the application program 410 stops being run by the user, the performance criteria are returned to their previous settings, in some embodiments, or may be returned to a default state.

The processor-based systems can include content-intelligent software for automatically tuning the performance characteristics of the system. For example, a firmware program running during power-on of the processor-based system can make assessments, based on the content being accessed, and drive the performance criteria accordingly. Application programs, such as music files, may automatically cause the system to be put into a "quiet" mode once they are run.

The above mechanisms provide a variety of ways in which the user may control the behavior of their processor-based system. These mechanisms can be used sequentially or in combination with one another, to fine-tune the system performance criteria. In some instances, there may be a hierarchy of performance rules, with one performance mechanism overriding another based on these rules. Since application programs do not each drive the processor in the same way, these tools enable the user to optimize the system usage, enhance the user experience, and perhaps even prolong the life of the system. Products sold with performance control mechanisms may appeal to some market segments. The performance control mechanisms also enhance user understanding of performance-related criteria, in some embodiments.

While the invention has been described with respect to a limited number of embodiments, those skilled in the art will appreciate numerous modifications and variations therefrom. It is intended that the appended claims cover all such modifications and variations as fall within the true spirit and scope of the invention.

I claim:

1. A processor-based system, comprising:
    a performance control apparatus, comprising a first selector, the first selector being adjustable, between a minimum setting and a maximum setting, to modify one or more performance criteria of the processor-based system, the performance criteria comprising a processor clock rate, a fan speed, and disk usage; and
    a performance control application program with a graphical user interface, the graphical user interface comprising at least one application program selector associated with an application program loaded in the processor-based system, wherein the application program selector is adjustable between a second minimum setting and a second maximum setting;
wherein the at least one application program selector enables a user to modify the one or more performance criteria during operation of the application program and the first selector enables the user to modify the one or more performance criteria during operation of the processor-based system.

2. The processor-based system of claim 1, further comprising a second selector, wherein the processor clock rate is controlled by the first selector and the fan speed is controlled by the second selector, the first selector and the second selector being independently controllable.

3. The processor-based system of claim 2, the first selector of the performance control apparatus further comprising first and second labels disposed at opposing ends of the first selector, the first label indicating the minimum setting and the second label indicating the maximum setting.

4. The processor-based system of claim 3, the performance control apparatus further comprising a display, the display having first and second indicators, wherein the first indicator conveys a processor temperature and the second indicator conveys a relative performance value of the processor-based system.

5. The processor-based system of claim 4, wherein the processor clock rate may exceed an optimum clock rate when the first selector is adjusted beyond a predetermined setting, wherein the predetermined setting is not the maximum setting.

6. The processor-based system of claim 5, wherein the first selector further comprises a plurality of light-emitting diodes, wherein one or more of the plurality of diodes sequentially lights up when the first selector is adjusted.

7. The processor-based system of claim 6, wherein one or more of the plurality of light-emitting diodes change color state when the first selector is adjusted beyond the predetermined setting.

8. The processor-based system of claim 1, wherein the application program selector enables the user to adjust and set the processor clock rate during execution of the application program.

9. The processor-based system of claim 8, wherein the performance control application program further comprises a second application program selector for enabling the user to adjust the fan speed during execution of the application program.

10. The processor-based system of claim 1, further comprising a performance control icon, accessible from within the application program, wherein the performance control icon enables the user to modify one or more performance criteria from within the application program.

11. A performance control apparatus, comprising:
    a plurality of selectors for designating one of several settings in a processor-based system, wherein each setting modifies one or more performance-related criteria of the processor-based system, the performance-related criteria comprising a processor clock rate, a fan speed, and a disk drive usage of the processor-based system, wherein each performance-related criterion is associated with a separate selector of the plurality of selectors;

a display comprising an indicator, wherein the indicator visually conveys a relative performance value for the processor-based system;

a first label; and a second label, the first and second labels being disposed adjacent to the selector, wherein the first label designates a minimum setting of the selector and the second label designates a maximum setting of the selector;

wherein the plurality of selectors comprises a first selector for controlling both the processor clock rate and the fan speed, wherein adjustment of the first selector simultaneously controls the fan speed and the processor clock rate.

12. The apparatus of claim 11, further comprising:

a plurality of light-emitting diodes, the plurality of light-emitting diodes being disposed adjacent to the selector, wherein one or more of the plurality of light-emitting diodes changes to a first color when the selector is not at the minimum setting;

the plurality of selectors further comprising:

a first selector for controlling the processor clock rate;

a second selector for controlling the fan speed, wherein the first and second selectors are independently controllable; and a third selector, the third selector being adjustable to modify the disk drive usage of the processor-based system by an application program;

wherein the third selector adjusts between the application program being executed from the disk drive and being executed from a volatile memory.

13. The apparatus of claim 12, wherein the processor clock rate may exceed an optimum clock rate.

14. The apparatus of claim 13, wherein one or more of the plurality of light-emitting diodes change to a second color when the processor clock rate exceeds the optimum clock rate.

15. The apparatus of claim 12, wherein the display further comprises a second indicator, wherein the second indicator visually conveys a processor temperature.

16. A performance control application program, to be run on a processor-based system, the performance control application program being viewable from a graphical user interface, the graphical user interface comprising:

a list of one or more software programs loaded into the processor-based system; and a selector for altering a processing speed of the processor-based system;

wherein the processing speed is altered while one software program of the one or more software programs is running on the processor-based system, but is not altered when the one software program is not running.

17. The performance control application program of claim 16, a portion of the one or more software programs being collected as a group, wherein the processing speed is altered when any software program in the group is running.

18. The performance control application program of claim 17, the graphical user interface further comprising a second selector for altering a system noise characteristic, wherein the first selector is independent of the second selector.

19. A performance control application program, to be run on a processor-based system, the performance control application program being viewable from a graphical user interface, the graphical user interface comprising:

a file type grouping, the file type grouping specifying a plurality of file extensions; and a configuration profile associated with the file type grouping, wherein the configuration profile specifies adjusting the speed of one or more fans operating within the processor-based system;

wherein the processor-based system automatically sets the configuration profile when a file having one of the plurality of file extensions is run.

20. The performance control application program of claim 19, further comprising:

a second file type grouping, the file type grouping specifying a second plurality of file extensions, the second plurality of file extensions being distinct from the first plurality of file extensions; and a second configuration profile associated with the second file type grouping, wherein the second configuration profile specifies adjusting a processor clock rate of the processor-based system.

* * * * *